UNITED STATES PATENT OFFICE.

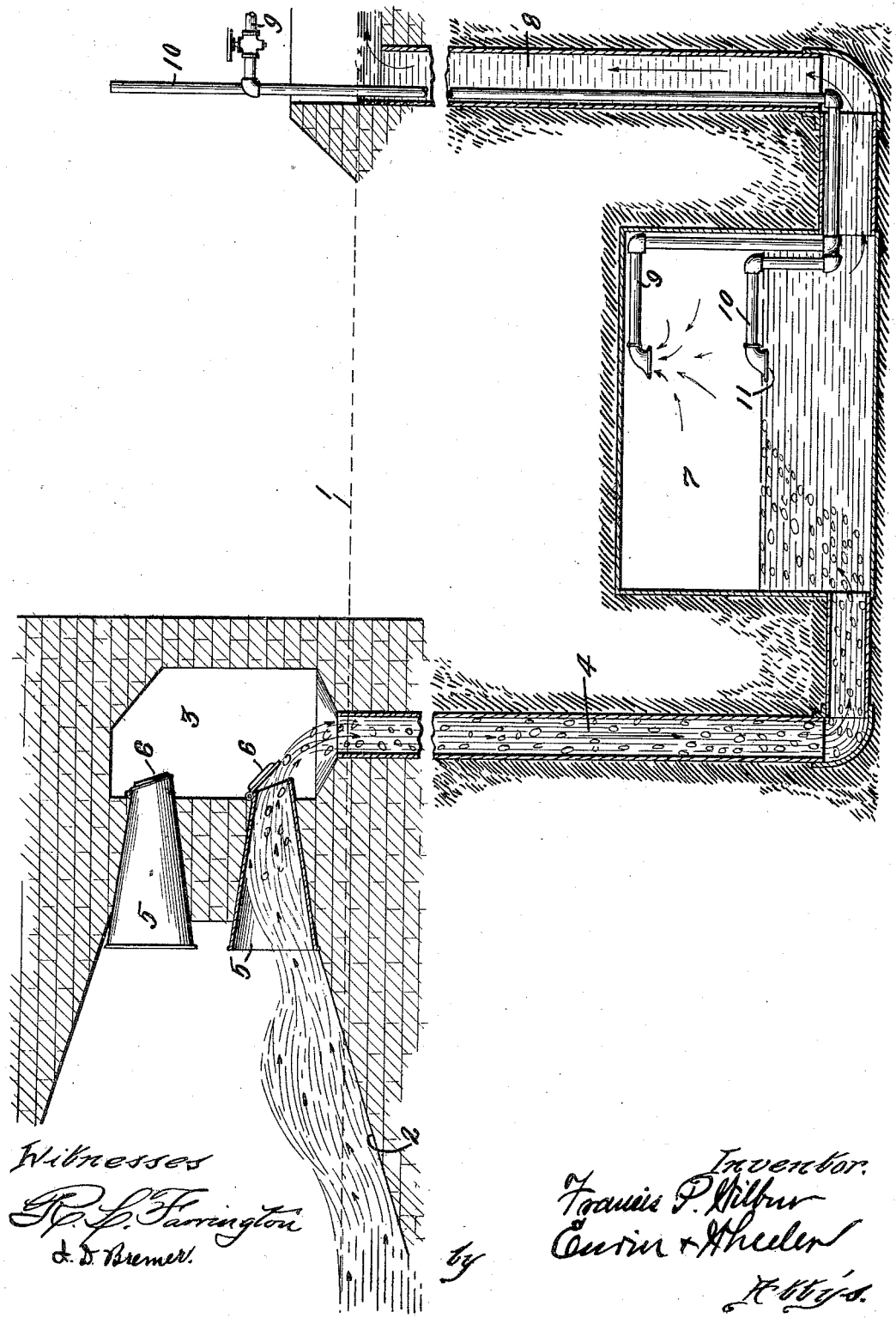

FRANCIS P. WILBUR, OF MILWAUKEE, WISCONSIN.

HYDRAULIC-POWER AIR-COMPRESSOR.

1,005,911. Specification of Letters Patent. Patented Oct. 17, 1911.

Application filed January 21, 1911. Serial No. 603,819.

*To all whom it may concern:*

Be it known that I, FRANCIS P. WILBUR, a citizen of the United States, residing at Milwaukee, county of Milwaukee, and State of Wisconsin, have invented new and useful Improvements in Hydraulic-Power Air-Compressors, of which the following is a specification.

The object of my invention is to accumulate and maintain a large volume of air under high pressure for power purposes.

I am aware of the fact that a flowing stream of water has heretofore been utilized to convey air to a receiving reservoir and subject the same to the pressure of a column of water at a great depth below the surface of the ground. Also that air for power purposes has heretofore been displaced and lightly compressed by waves and the rising tide. By my improvements, however, I utilize both the rising waves produced by wind and tide, in addition to the gravity of a column of water for accumulating and compressing air, the rising waves being utilized for two purposes—1st, to raise the water above the normal sea level, whereby in flowing back, it is forced through an inverted siphon duct, and 2nd, to apply the force of the waves for both forcing a large volume of trapped air into the descending water column, and applying a downward pressure to the surface of said column, whereby the elasticity of the compressed air is utilized in addition to the gravity of the water for forcing the latter through said inverted siphon.

My invention is further explained by reference to the accompanying drawing, which represents a vertical section of the several coöperating parts thereof.

Like parts are identified by the same reference numerals.

For best results, the system is preferably located at such a point on the sea shore as will be most exposed to wind and tide or at a point where from any cause, the action of the waves is most constant and uniform. The dotted line 1 represents the normal sea level and 2 is an inclined way, which is preferably made smooth and is of such an inclination as will cause the incoming waves of a given height to flow with the greatest force to the highest elevation.

3 is an air chamber into which the rising waves are driven with a force corresponding with their elevation and momentum, whereby the confined air in said chamber is compressed when it re-acts with an elastic force upon the water in said chamber, and coöperates, as stated, with the gravity of the water to force the latter more rapidly through the descending duct 4, while the volume of air which is carried down with the water in said duct, is greatly increased by the pressure of the air thereon. The rising waves are conducted from the inclined way 2 to the air chamber 3, through a plurality of ducts 5 and the discharge end of said ducts 5 are each provided with outwardly opening valves 6, which valves are adapted to be opened by the force of the waves and pressure of the escaping water, when they are closed of their own gravity coöperating with the pressure of the air and water in said chamber, whereby the air which is forced into said chamber by the rising waves is trapped and retained therein until its elastic force is expanded in driving the water down through said duct 4. The ducts 5 are preferably made conical in shape diverging from their discharge ends, whereby the largest waves may enter them more readily when the speed or force of such waves will be concentrated and accelerated, as they escape through their smaller discharge ends. The water thus led to the air chamber passes from thence into the lower side of the air reservoir 7, through said duct 4. As the water thus flows into the duct 4, a large volume of air which is normally in the water, together with a large additional quantity, is forced by its elastic action into the water as it passes from the air chamber down into said outlet duct. As the commingled water and air passes into the chamber 7 and the movement of the water is retarded, the air escapes therefrom and rises to the top of said chamber, when it is subjected to a pressure of water corresponding with the height of the column of water in the outlet duct 8, through which duct 8 the water escapes at a slight distance above the sea level.

9 is an outlet air duct, through which the compressed air is led from the top of the chamber 7 to a power plant, where its stored energy is utilized.

10 is a blow off pipe, the mouth of which is normally closed with the water, when the column of water in said pipe will balance the normal air pressure and prevent the air from escaping. When, however, the discharge end of the duct 9 is closed for a sufficient length of time, the accumulation of air in the chamber 7 may be such as to force the water below the mouth 11 of the blow off pipe, when a sufficient quantity of air will be permitted to escape from said chamber to permit the water to again rise around the mouth 11 of said blow off pipe, whereby the further escape of compressed air is prevented.

While I have shown two ducts leading from the inclined way to the air chamber 3, it is obvious that the number of said ducts may be indefinitely increased and said ducts may be arranged in alinement with each other upon the same horizontal plane, or two or more series of ducts may be arranged parallel with each other upon different planes, when, of course, the lower series of ducts will receive the small waves, while the larger waves only will reach the higher series of ducts.

Having thus described my invention, what I claim as new, and desire to secure by Letters Patent, is—

1. In a device of the described class, the combination of a water way for the passage of waves as they rise above the normal sea level, an air chamber, a water duct communicating from said water ways to said air chamber, a valve connected with the discharge end of said duct adapted to be automatically opened by the passage of water therethrough and to be automatically closed as soon as the flow of water through said ducts ceases, a duct extending from said air chamber to a water chamber below the sea level, a water chamber located at the lower extremity of said last named duct into which the water and air from said last named duct is discharged, an outlet water duct leading from the bottom of said water chamber to the surface of the ground, and an air duct leading from the top of said water chamber to a power plant or other place for use.

2. In a device of the described class, the combination of a water way for the passage of waves as they rise above the normal sea level, an air chamber, a plurality of water ducts communicating from said water way to said air chamber, a valve connected with the discharge end of each of said ducts, said valves being adapted to be operated by the passage of water through said ducts and to be automatically closed as soon as the passage of water through said ducts ceases, a duct extending from said air chamber to a water chamber below the sea level, a water chamber located at the lower extremity of said last named duct into which the water and air from said last named duct are discharged, an outlet water duct leading from the bottom of said water chamber to the surface of the ground and an air duct leading from the top of said water chamber to a power plant or other place for use.

3. In a device of the described class, the combination of a water way, an air tight chamber for the reception of water and air, a duct communicating from said water way to said chamber, a valve connected with the discharge end of said duct, adapted to be automatically opened by the passage of water and to be automatically closed as soon as the passage of water ceases, a water chamber located below the surface of the ground, a duct for the passage of air and water, communicating from said air chamber to said water chamber, a duct leading from said water chamber to the surface of the ground, an air duct communicating from the top of said water chamber to a power plant or other place for use, and a blow off pipe communicating from near the bottom of said water chamber to the surface of the ground, all substantially as and for the purpose specified.

In testimony whereof I affix my signature in the presence of two witnesses.

FRANCIS P. WILBUR.

Witnesses:
JAS. B. ERWIN,
I. D. BREMER.

---

Copies of this patent may be obtained for five cents each, by addressing the "Commissioner of Patents, Washington, D. C."